Figure 1:
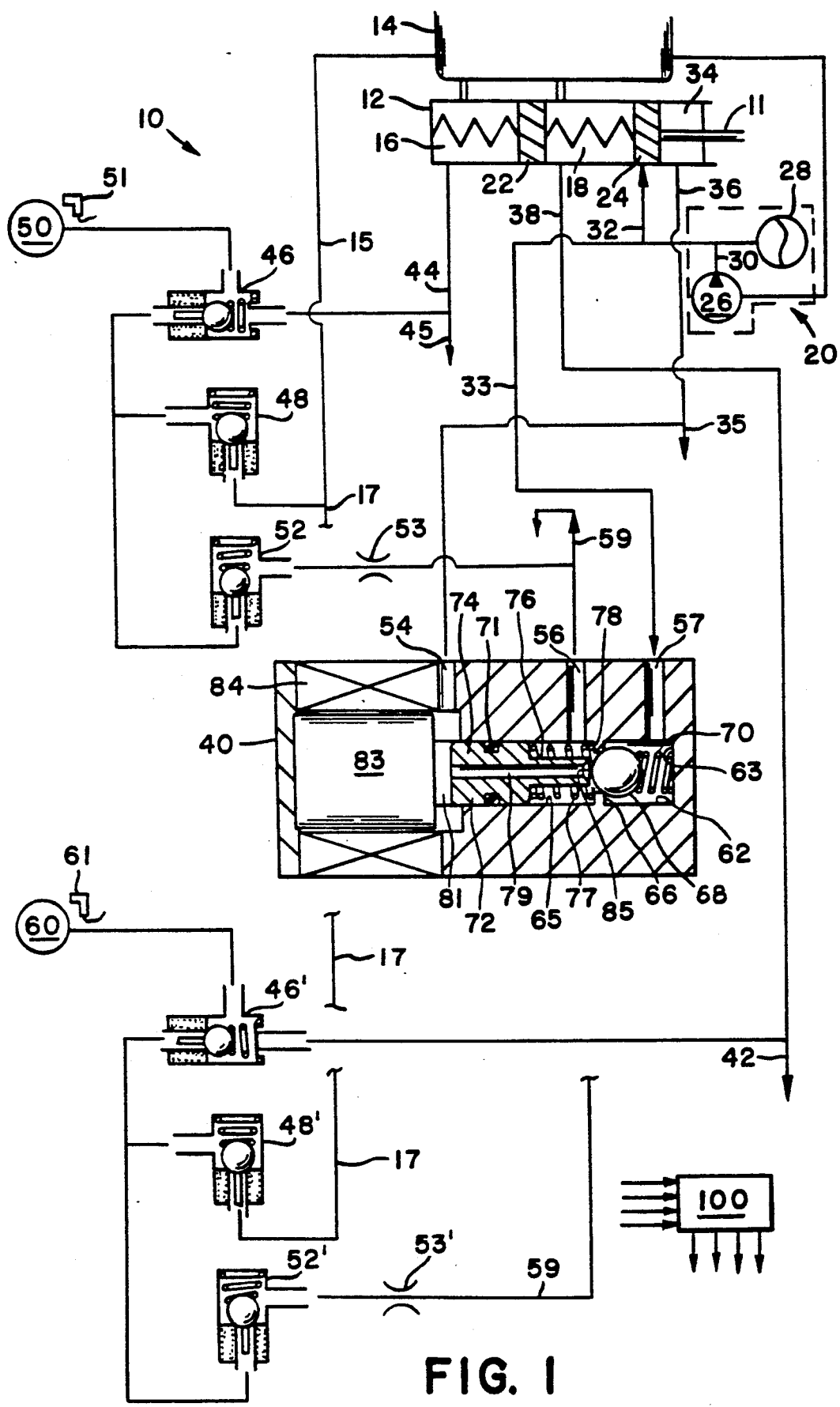

United States Patent [19]

Brown

[11] Patent Number: 5,172,963
[45] Date of Patent: Dec. 22, 1992

[54] PRESSURE SUPPLY VALVE FOR AN ADAPTIVE BRAKING AND TRACTION CONTROL SYSTEM

[75] Inventor: G. Emerson Brown, Niles, Mich.
[73] Assignee: Allied-Signal Inc., Morristown, N.J.
[21] Appl. No.: 570,930
[22] Filed: Aug. 17, 1990
[51] Int. Cl.⁵ ............................................ B60T 15/00
[52] U.S. Cl. ............................. 303/113.3; 303/113.2; 303/119.2; 303/901
[58] Field of Search ................ 303/119, 110, 93, 115, 303/114, 116, 113 TR, 115 EC, 119 SV, 116 R, DIG. 6, 113 TB

[56] References Cited

U.S. PATENT DOCUMENTS

| | | | |
|---|---|---|---|
| 4,514,981 | 5/1985 | Brown et al. | 91/434 X |
| 4,620,565 | 11/1986 | Brown | 303/119 X |
| 4,714,300 | 12/1987 | Heess et al. | 303/115 |
| 4,778,226 | 10/1988 | Brown | 303/116 R |
| 4,836,617 | 6/1989 | Resch | 303/113 TR X |
| 4,840,434 | 6/1989 | Leiber | 303/119 X |
| 4,844,119 | 7/1989 | Martinic | 303/119 X |
| 4,848,853 | 7/1989 | Mizuno et al. | 303/110 |
| 5,005,919 | 4/1991 | Shuey et al. | 303/119 SV |
| 5,013,094 | 5/1991 | Nishii et al. | 303/113 TR X |

FOREIGN PATENT DOCUMENTS

| | | | |
|---|---|---|---|
| 0279981 | 8/1988 | European Pat. Off. | 303/114 |
| 0320943 | 6/1989 | European Pat. Off. | |
| 3147149 | 10/1982 | Fed. Rep. of Germany | |
| 1138043 | 6/1957 | France | |
| 0043075 | 4/1977 | Japan | 303/115 EC |
| 0071749 | 4/1987 | Japan | 303/119 SV |
| 8901431 | 2/1989 | PCT Int'l Appl. | |
| 842238 | 7/1960 | United Kingdom | |
| 2153025 | 8/1985 | United Kingdom | |
| 2165905 | 4/1986 | United Kingdom | |
| 2169370 | 7/1986 | United Kingdom | 303/114 |

Primary Examiner—Robert J. Oberleitner
Assistant Examiner—Josie A. Ballato
Attorney, Agent, or Firm—Larry J. Palguta; Ken C. Decker

[57] ABSTRACT

The pressure supply valve (40) provides hydraulic pressure from a pressure source (20) to the system modulators (46, 46', 48, 48', 52, 52') and isolates a hydraulic boost chamber (34) of a boosted master cylinder (12). The pressure supply valve (40) includes an armature (83) operated piston valve (72) having a through opening (79), a valve seat (85) of the piston valve (72) engageable with a ball valve (68). The ball valve (68) normally prevents fluid flow from the pressure source (20) to the modulators (46, 46', 48, 48', 52, 52'), and the piston valve (72) permits fluid flow through itself during normal and adaptive braking. During traction control operation, the piston valve (72) displaces the ball valve (68) and permits the pressure source (20) to communicate with the modulators (46, 46', 48, 48', 52, 52').

6 Claims, 1 Drawing Sheet

PRESSURE SUPPLY VALVE FOR AN ADAPTIVE BRAKING AND TRACTION CONTROL SYSTEM

The present invention relates generally to a pressure supply valve for a traction control system, and in particular to the pressure supply valve of a traction control system for a replenishment type adaptive braking system.

Hydraulic fluid replenishment systems have been utilized in combination with adaptive braking systems. Typically, the boost pressure of the replenishment system is utilized for brake pressure building during adaptive braking system cycling. The boost pressure is typically directly proportional to the driver input force and is usually equal to the master cylinder pressure. In an adaptive braking system having traction control, the boost pressure is typically applied automatically by the system to the wheel brakes in order to prevent excessive slippage of the wheels during acceleration. This occurs even though the vehicle operator is not applying the brakes. One can utilize two solenoids, a two-way solenoid and a three-way solenoid, in order to open the pressure source and supply modulated fluid pressure to the brake and to isolate the source of boost pressure from direct communication with the boost chamber of the boosted master cylinder or booster. It is highly desirable to provide a single solenoid or armature operated valve mechanism which will both isolate the boost chamber of the booster from the direct communication of hydraulic pressure generated by the pressure source and to open or control the flow of pressurized fluid from the pressure source to a modulation mechanism effecting the traction control function. It is also desirable that the single mechanism provide a means for limiting the maximum fluid pressure which may be provided to the modulator effecting the traction control function.

The present invention provides solutions to the above problems by providing an adaptive braking and traction control system, comprising a hydraulic pressure boosted master cylinder receiving hydraulic pressure from a pressure source, the pressure source and a boost chamber of said master cylinder communicating with a traction control supply valve, a pressure chamber of the master cylinder and the traction control supply valve each connected with a wheel brake via modulator means of the system, the traction control supply valve comprising an armature which when energized displaces a piston valve, and valve means for normally preventing said pressure source from communicating with said wheel brake, and control means for controlling operation of said adaptive braking and traction control system, so that during traction control operation the control means causes said armature to displace said piston valve to terminate the communication of the boost chamber with the supply valve and open the valve means to Permit controlled fluid flow from the pressure source to said modulator means.

The invention is described in detail with reference to the drawing which illustrates an embodiment in which:

FIG. 1 illustrates a selected portion of an adaptive braking and traction control system containing the traction control supply valve of the present invention.

The adaptive braking and traction control system with supply valve of the present invention is designated generally by reference numeral 10 in FIG. 1. FIG. 1 illustrates approximately one-half of the entire system, and in particular the portion of the system associated with right and left front wheel brakes 50, 60. A traction control supply valve 40 will control the application of hydraulic fluid pressure to both front drive wheels of the vehicle. The connections shown for right front wheel brake 50 are similar to the connections of the left front wheel brake 60 and associated components. The system shown is a diagonal split brake circuit as described in detail below. Should the vehicle be a four-wheel drive vehicle, then another traction control supply valve may be utilized for the rear wheels. It should be clearly understood that the traction control supply valve may be utilized with whatever type of adaptive braking system is utilized.

System 10 includes a full power hydraulic booster 12 such as that described and illustrated in Brown et al. U.S. Pat. No. 4,514,981. Booster 12 comprises essentially a master cylinder that receives a hydraulic pressure boost from pressure source 20 which provides a power boost for the application of the braking system. Master cylinder 12 includes three-section reservoir 14 which communicates with secondary pressure chamber 16 and primary pressure chamber 18 having associated secondary piston 22 and primary piston 24. Pressure source 20 comprises pump 26 accumulator 28, the pump communicating with the reservoir 14 via line 13 and with the high pressure accumulator 28 via line connection 30 which also communicates via line 32 with hydraulic booster 12. Boost pressure provided via line connection 32 flows proportionally from boost chamber 34 of master cylinder 12 to boost line 36 which communicates with traction control supply valve 40 and with not shown rear wheel brakes (via line 35) through associated adaptive braking system components (not shown build and isolation valves). Primary pressure chamber 18 of booster 12 communicates via line 38 with left front wheel brake 60 via associated adaptive braking and traction control system components, and also with adaptive braking and traction control components of a right rear wheel brake (not shown) via line 42. Secondary pressure chamber 16 of booster 12 communicates via line 44 with right front wheel brake 50 via isolation valve 46, and with a not shown left rear wheel brake (via line 45) and its associated adaptive braking system components. Right front wheel brake 50 is associated with an adaptive braking and traction control set of components comprising the electrically operated isolation valve 46, and electrically operated decay valve 48 and electrically operated build valve 52. Build valve 52, decay valve 48 and isolation valve 46 may each comprise separate components or may comprise a single component, or two components, depending on how the manufacturer wishes to commonize the functions within one or more electrically operated components. For the purposes of illustration only, the valves are shown as separate valves each of which is electrically operated by the electronic control unit (ECU) 100. Each illustrated wheel brake 50 and 60 includes an associated speed sensor 51, 61 which communicates with ECU 100. Build valve 52 includes build valve orifice 53 associated therewith. Left front wheel brake 60 and the rear wheel brakes (not shown) have similar electrically operated sets of valves.

Traction control supply valve 40 includes first or inlet port 54 which receives fluid Pressure from boost line 36, a second or outlet port 56 which transmits fluid pressure to build valve orifice 53 and build valve 52, in addition to communicating the pressure via line 59 to build valve 52' and build valve orifice 53' of left front wheel brake 60. Supply valve 40 includes pressure source port 57 which receives hydraulic pressure from pressure source 20 via line connection 33. Valve 40 includes stepped bore 62 comprising pressure source chamber 63 and boost source chamber 65. Boost source chamber 65 communicates with ports 54 and 56, and pressure supply chamber 63 communicates with port 57. Stepped bore 62 includes a bare valve seat 66 which receives ball supply valve 68 biased by spring 70. Piston valve 72 comprises large diameter valve section 74 with seal 71 and reduced diameter valve section 76 defining therebetween shoulder 75 biased by resilient means 77. Resilient means 77 extends between shoulder 75 and bore shoulder 78. Piston valve 72 includes longitudinal through opening 79 communicating with transverse opening 81 that communicates with port 54 receiving pressure from boost line 36. Piston valve 72 is controlled by armature 83 disposed within coil winding 84. Winding 84 may be operated by ECU 100 so that it displaces piston valve 72 whereby valve seat 85 engages ball valve 68 to close off fluid flow through longitudinal through opening 79 and isolate port 54 from port 56. Likewise, the displacement of piston valve 72 may displace ball valve 68 away from valve seat 66 to permit hydraulic pressure from pressure source 20 to be communicated between port 57 and port 56.

During normal braking, the vehicle operator depresses the brake pedal to displace axially input member 11 which permits fluid pressure from line connection 32 to communicate to boost chamber 34 and provide a hydraulic pressure boosted actuation of primary and secondary pistons 24, 22. Pressure generated within secondary pressure chamber 16 is communicated via line 44 to the right front wheel brake via isolation valve 46. Pressure communicated via line 44 is also communicated to the left rear wheel brake (not shown) via line 45. Likewise, pressure generated within primary pressure chamber 18 is communicated to left front wheel brake 60 via line 38 and to the right rear wheel brake (not shown) via line 42.

During adaptive braking operation, the vehicle operator will depress the brake pedal to displace axially input member 11 and effect pressure within the primary and secondary pressure chambers of booster 12. The ECU will sense an imminent skidding condition and energize the isolation valves of the adaptive braking system, including isolation valves 46 and 46', so that the pressure chambers of booster 12 are isolated from the respective wheel brakes. Activated pump 26 supplies fluid pressure to the accumulator and to port 57 of supply valve 40. Ball valve 68 is closed so that this pressure is not communicated to the front wheel brakes. However, hydraulic pressure from pressure source 20 is communicated via line 32 to booster 12, boost chamber 34 and via line 36 to port 54 of supply valve 40. Pressure from boost chamber 34 is also communicated via line 35 to the associated rear adaptive braking system components. Because armature 83 of valve 40 is not energized during adaptive braking, boost pressure from boost line 36 is communicated to inlet port 54 of valve 40 and passes freely through transverse opening 81, longitudinal through opening 79, outlet port 56, and to build valve 52 of right front wheel brake 50, and also to build valve 52' of left front wheel brake 60 via line 59. The ECU activates build valves 52, 52' so that pressure received from boost line 36 is communicated via valve 40 through the build valves to wheel brakes 50, 60 via now activated isolation valves 46, 46'. When pressure is to be decayed away from the wheel brakes, build valves 52, 52' are deenergized to stop boost flow from port 56, and decay valves 48, 48' are energized so that fluid pressure is communicated to replenishment line 15 which receives fluid pressure from both right front wheel brake 50 and left front wheel brake 60 via line 17. The decayed pressure is replenished to the reservoir as is typical in a replenishment type system. The adaptive braking system components and operation would be essentially the same for the rear wheels, depending on the type of brake system utilized.

During traction control system operation, the vehicle operator is not depressing the brake pedal, and the system applies the brakes automatically to prevent excessive wheel slippage. The ECU 100 activates armature 83 by operatively energizing coil 84 so that piston valve 72 is displaced axially against resilient means 77. Valve seat 85 of section 76 engages ball valve 68 which prevents any fluid pressure received in boost chamber 63 from being communicated past the being opened ball valve 68 and back through opening 79, port 54, and boost line 36 to boost chamber 34 of booster 12. Piston valve 72 then moves ball valve 68 away from seat 66 so that pressure from activated pressure source 20 may be supplied controllably to outlet port 56 and the associated build valves and activated isolation valves of both front wheel brakes 50, 60. Thus, valve 40 initially isolates boost chamber 34 of booster 12 so that fluid pressure cannot flow back toward this chamber, and then controllably provides hydraulic pressure from source 20 to the modulators comprising isolation valves 46, 46', build valves 52, 52' and decay valves 48, 48' during traction control so that excessive wheel slippage is prevented. The maximum pressure supplied by valve 40 to the build valves during traction control can be limited by sizing the areas of the large diameter section and reduced diameter section of piston valve 72 such that a hydraulic force may oppose the armature force. With appropriate sizing, when the hydraulic force on piston valve 72 exceeds the armature force which is controllable by ECU 100, piston valve 72 will be displaced toward the left in FIG. 1 and ball valve 68 will be closed to limit the flow of fluid pressure from pressure source 20. At the termination or end of traction control operation, traction control supply valve 40 is deenergized. Any build pressure within the system is communicated to outlet port 56 so that piston valve 72 is moved toward the illustrated open position and thus permit fluid pressure to pass through longitudinal through opening 79, transverse opening 81, and inlet port 54 for communication via boost line 36 to boost chamber 34.

I claim:

1. In an adaptive braking and traction control system, comprising a hydraulic pressure boosted master cylinder receiving hydraulic pressure from a pressure source, the pressure source and a boost chamber of said master cylinder communicating with a traction control supply valve, a pressure chamber of the master cylinder and the traction control supply valve each connected with a wheel brake via modulator means of the system, the traction control supply valve comprising an armature which when energized displaces a piston valve, and supply valve means for normally preventing said pressure source from communicating with said wheel brake, and control means for controlling operation of said adaptive braking and traction control system, so that the control means causes said armature to energize and displace said piston valve only during traction control system operation in order to prevent the boost chamber from receiving fluid pressure from the traction control supply valve and to open the supply valve means and permit controlled fluid flow from the pressure source to said modulator means, said traction control supply valve having a stepped bore and the piston valve comprising a large diameter valve section slidable in said bore, a reduced diameter valve section, and a longitudinal through opening of the piston valve which enables fluid pressure from said boost chamber to communicate, during adaptive braking system operation, with build and decay valve means of said modulator means, the bore including resilient means biasing said piston valve away from said supply valve means, the supply valve means comprising a ball valve biased by a spring against a bore valve seat which is disposed within said stepped bore, and the displacement of the piston valve causing substantially simultaneously an end of the reduced diameter valve section to engage the ball valve such that the ball valve is moved away from said valve seat and engagement of the ball valve with said end preventing fluid flow through said longitudinal through opening of the piston valve.

2. The system in accordance with claim 1, wherein said system comprises a replenishment type adaptive braking system herein fluid pressure from said brake is decayed away from said brake during adaptive braking system operation and returned to a reservoir of the master cylinder, the reservoir communicating with the pressure source.

3. The system in accordance with claim 2, wherein said pressure source comprises a pump communicating with an accumulator to provide pressure to said master cylinder and to said traction control supply valve.

4. The system in accordance with claim 1, wherein the traction control supply valve remains completely inactive during adaptive braking system operation, the traction control supply valve permitting fluid flow therethrough during adaptive braking system operation.

5. The system in accordance with claim 1, wherein a fluid return line of the system communicates with a reservoir of the master cylinder.

6. The system in accordance with claim 5, wherein the reservoir communicates with said pressure source.

* * * * *